United States Patent
Ishii

(10) Patent No.: US 6,918,024 B2
(45) Date of Patent: Jul. 12, 2005

(54) ADDRESS GENERATING CIRCUIT AND SELECTION JUDGING CIRCUIT

(75) Inventor: Daiji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 205 days.

(21) Appl. No.: 10/202,330

(22) Filed: Jul. 24, 2002

(65) Prior Publication Data

US 2003/0023829 A1 Jan. 30, 2003

(30) Foreign Application Priority Data

Jul. 27, 2001 (JP) ..................................... 2001-227712

(51) Int. Cl.⁷ ............................................. G06F 12/00
(52) U.S. Cl. ...................... 711/219; 711/220; 708/670; 708/671; 708/672; 708/673; 708/708; 708/710; 708/650
(58) Field of Search ........................ 711/219–220, 202, 711/217; 708/708, 710, 670–672, 495–497, 650, 673, 491, 524

(56) References Cited

U.S. PATENT DOCUMENTS

| | | | | |
|---|---|---|---|---|
| 4,319,335 A | * | 3/1982 | Rubinfield .................. 708/710 |
| 4,584,661 A | * | 4/1986 | Grundland .................. 708/712 |
| 4,754,422 A | * | 6/1988 | Sakai et al. ................. 708/650 |
| 4,761,757 A | * | 8/1988 | Sakai et al. ................. 708/650 |
| 4,800,524 A | * | 1/1989 | Roesgen ..................... 711/217 |
| 4,833,602 A | * | 5/1989 | Levy et al. ................. 711/217 |
| 5,007,010 A | * | 4/1991 | Flora .......................... 708/673 |
| 5,105,378 A | * | 4/1992 | Mori .......................... 708/650 |
| 5,206,828 A | * | 4/1993 | Shah et al. ................. 708/708 |
| 5,222,037 A | * | 6/1993 | Taniquchi ................... 708/497 |
| 5,249,148 A | * | 9/1993 | Catherwood et al. ....... 708/491 |
| 5,381,360 A | * | 1/1995 | Shridhar et al. ............ 708/491 |
| 5,506,800 A | * | 4/1996 | Dao-Trong ................. 708/531 |
| 5,623,621 A | * | 4/1997 | Garde ......................... 711/220 |
| 5,798,955 A | * | 8/1998 | Matsubara .................. 708/490 |
| 5,905,665 A | * | 5/1999 | Rim ........................... 708/491 |
| 5,983,333 A | * | 11/1999 | Kolagotla et al. .......... 711/219 |
| 6,298,367 B1 | * | 10/2001 | Oberman et al. ........... 708/524 |
| 6,772,186 B1 | * | 8/2004 | Tonomura et al. .......... 708/625 |
| 6,799,246 B1 | * | 9/2004 | Wise et al. ................. 711/117 |
| 2002/0124039 A1 | * | 9/2002 | Inoue et al. ................ 708/670 |

FOREIGN PATENT DOCUMENTS

| | | |
|---|---|---|
| JP | 7-168753 | 7/1995 |
| JP | 2001-227712 | 7/2001 |

* cited by examiner

*Primary Examiner*—Matthew Anderson
*Assistant Examiner*—Zhuo H. Li
(74) *Attorney, Agent, or Firm*—Scully, Scott, Murphy & Presser

(57) ABSTRACT

An address generating circuit, in which address generation by a modulo addition is executed at high speed, is provided. The address generating circuit makes, a two input adder that adds an address and a renewing step, a three input adder and subtracter that adds the address and the renewing step and further adds the size of a modulo area to this added result or subtracts the size of the modulo area from this added result, and a selection judging circuit that generates a selection signal for selecting one of the outputs from the two input adder and the three input adder and subtracter, work in parallel and independently. And a multiplexer selects one of the outputted results from the two input adder and the three input adder and subtracter based on the selection signal from the selection judging circuit.

7 Claims, 8 Drawing Sheets

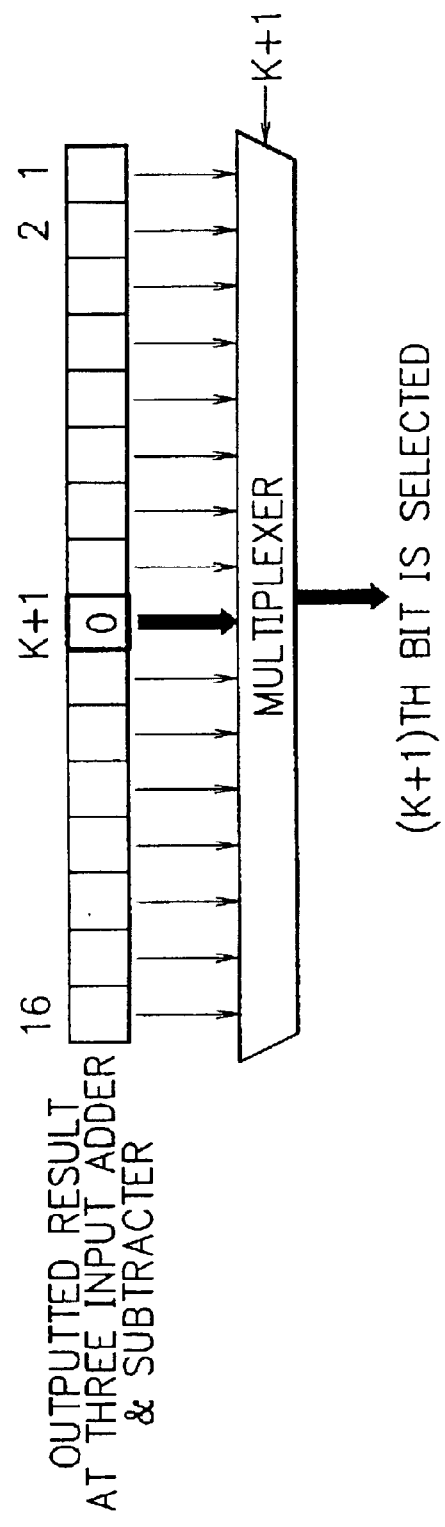
FIG. 5

F I G. 6
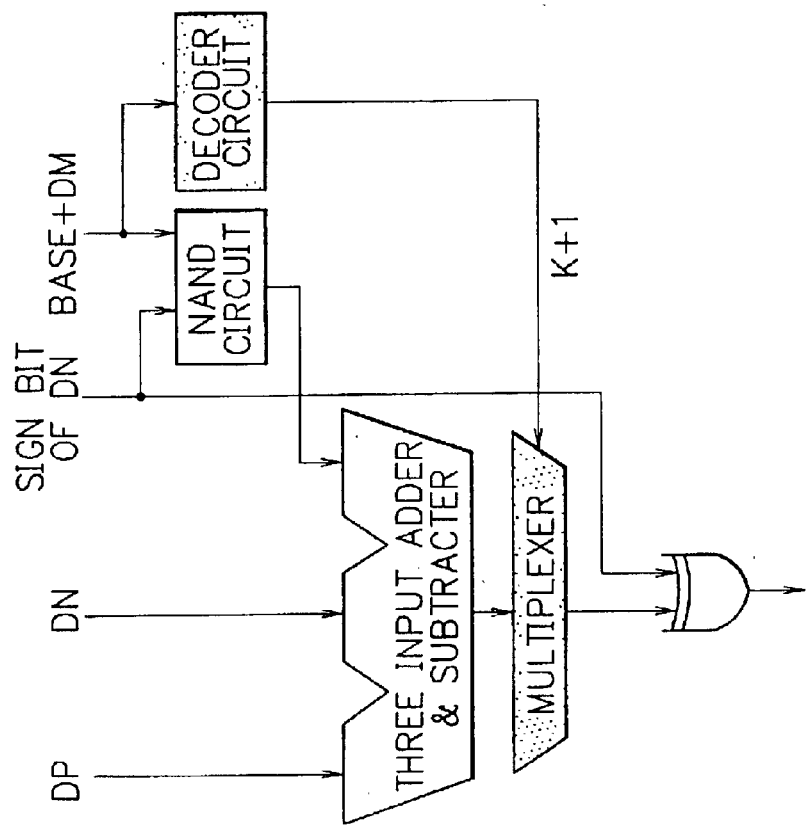
(B) SELECTION JUDGING CIRCUIT 203 AT CONVENTIONAL TECHNOLOGY
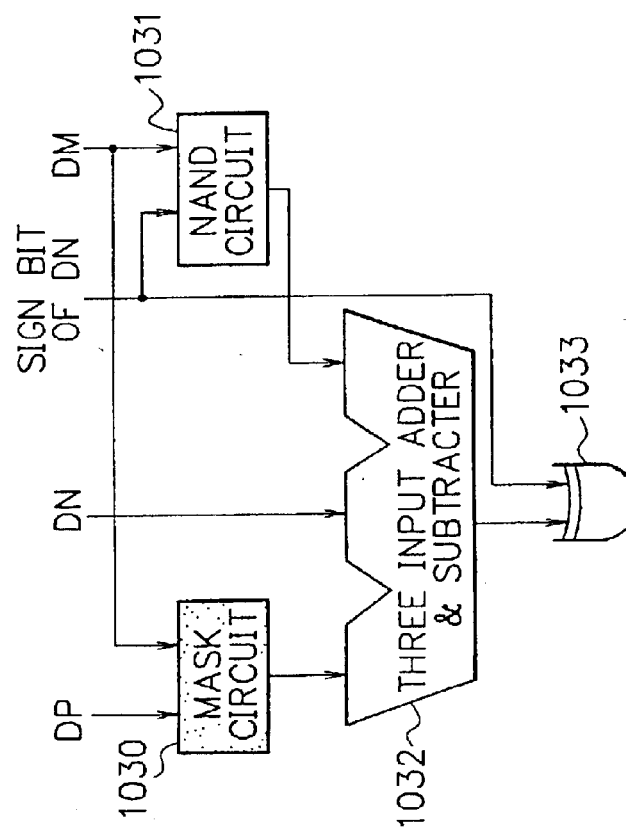
(A) SELECTION JUDGING CIRCUIT 103 AT PRESENT INVENTION FIG. 7
(A) CONVENTIONAL TECHNOLOGY (TWO INPUT ADDER 201 AND TWO INPUT ADDER & SUBTRACTER 202 IN FIG.1)
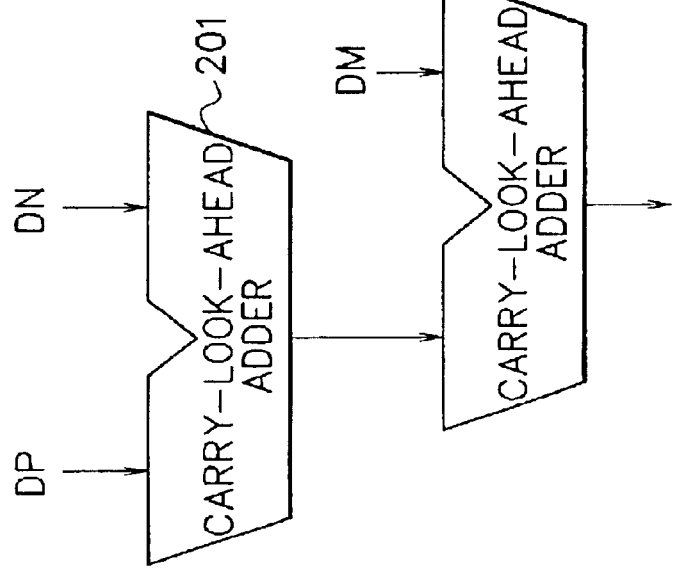
(B) PRESENT INVENTION (THREE INPUT ADDER & SUBTRACTER 1032 IN FIG.4)
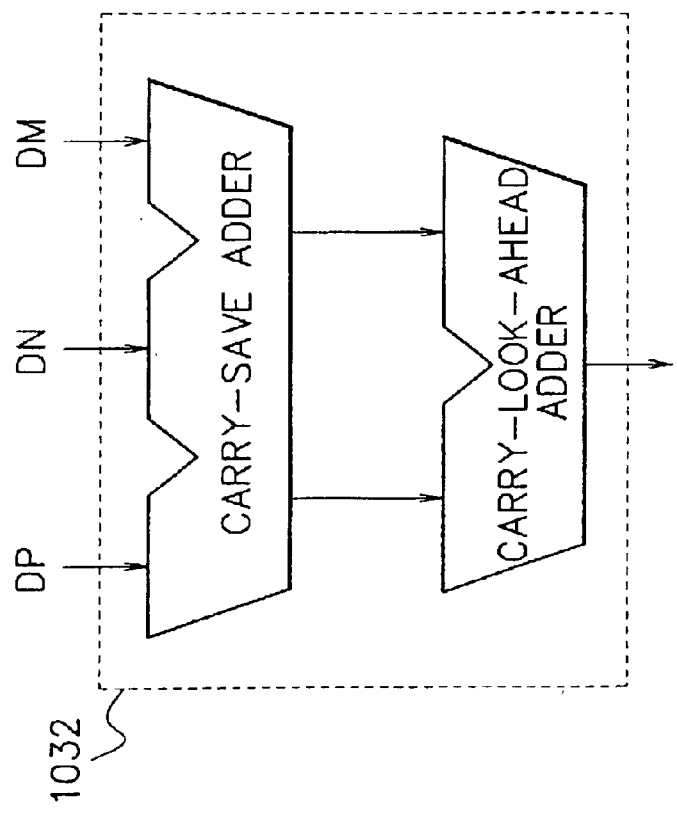

ADDRESS GENERATING CIRCUIT AND SELECTION JUDGING CIRCUIT

BACKGROUND OF THE INVENTION

The present invention relates to an address generating circuit and a selection judging circuit used in this address generating circuit, in which address generation by a modulo addition is executed at high speed.

DESCRIPTION OF THE RELATED ART

A digital signal processor (DSP), which processes digital signals effectively and at high speed, is often built in an apparatus. However, the total size and the manufacturing cost of the apparatus have some limits, consequently, the size of the DSP chip is limited to a certain size. Especially the size of the on-chip memory, on the DSP, is limited to a size. In order to solve this problem, architecture, which does not decrease the efficiency of the DSP even though the size of the on-chip memory is limited to a size, is adopted. For example, in the modulo addressing, which is one of the memory accessing methods for the DSP, a memory area is accessed cyclically by using an address generated by the modulo addition. With this, the limited memory area can be used cyclically many times. Therefore, the memory area is used effectively, however, the modulo addition generating the address is different from a normal addition, i.e. when the added result deviates from an upper bound value or a lower bound value, the added result must be corrected to an appropriate value. As a result, the delay time becomes large in the circuit. Further, the modulo addition circuit has a possibility the delay time is the largest (critical path) in the all data paths of the DSP, as well as a multiplier on the DSP. Therefore, an address generating circuit, which can execute the modulo addition at high speed, has been required.

Japanese Patent Application Laid-Open No. HEI 7-168753 has disclosed a modulo adding circuit and an operating method thereof. In this patent application, an address generating circuit, which executes the modulo addition at high speed, has been disclosed. And the addition and correction operation at the modulo addition are executed by using plural operating sections.

At this conventional address generating circuit, the size DM of the memory area accessed by of the modulo addressing is shown as $2^{K-1} \leq DM < 2^K$, and it is also shown that lower K bits at the head address BASE in the memory area are all '0'. Further it is shown that the address generated by this address generating circuit becomes an arbitrary integer from BASE to BASE+DM−1. Hereinafter the memory area accessed by the modulo addressing is referred to as a modulo area.

Under these conditions mentioned above, at the conventional address generating circuit, an address DP' after renewed is generated by adding a renewing step DN to an address DP before being renewed. In this, when the DN is a negative value and the value after added becomes smaller than the head address BASE, the DM is added to the value after added. And when the DN is a positive value, and the value after added becomes equal to or larger than the BASE+DM, the DM is subtracted from the value after added. That is, the DP' after renewed is given by that the value after added is corrected by applying the method mentioned above.

FIG. 1 is a block diagram showing a structure of the conventional address generating circuit. As shown in FIG. 1, the conventional address generating circuit provides a two input adder 201, a two input adder and subtracter 202, a selection judging circuit 203, and a multiplexer 204. The two input adder 201 adds a renewing step DN 206 to an address before being renewed DP 205. The two input adder and subtracter 202 adds the size DM 207 of the modulo area to an added result 208 outputted from the two input adder 201 or subtracts the size DM 207 of the modulo area from the added result 208 outputted from the two input adder 201. The selection judging circuit 203 generates a selection signal 210 for selecting one of the outputted results 208 and 209 from the two input adder 201 and the two input adder and subtracter 202, by comparing the value of the outputted result 208 with the value of the BASE or the BASE+DM. The multiplexer 204 outputs an address DP' 211 after renewed as a circuit output by selecting one of the outputted results 208 and 209 based on the selection signal 210. In this, the selection judging circuit 203 outputs '0' when the judged result is true, and outputs '1' when the judged result is false, as the selection signal 210. The multiplexer 204 outputs the outputted result 209 from the two input adder and subtracter 202 when the selection signal is '0', and outputs the outputted result 208 from the two input adder 201 when the selection signal is '1'.

Next, operation of the conventional address generating circuit is explained. At this conventional address generating circuit, both addresses, in cases that the correction is needed and is not needed, are calculated speculatively, and one of the addresses is selected by judging whether the correction is needed or not, and the selected address is outputted.

First, in order to calculate an address in case that the correction is not needed, the two input adder 201 adds the DN206 to the DP205. Next, in order to calculate an address in case that the correction is needed, the two input adder and subtracter 202 subtracts the DM 207 from the added result 208 in case that the DN 206 is a positive value. And in case that the DN 206 is a negative value, the two input adder and subtracter 202 adds the DM 207 to the added result 208. In parallel with the operation at the two input adder and subtracter 202, the selection judging circuit 203 outputs the selection signal 210, by judging whether the correction is needed or not as follows: In case that the DN 206 is a positive value, the selection judging circuit 203 judges whether the added result 208 is equal to or larger than the BASE+DM or not, and when the added result 208 is equal to or larger than the BASE+DM, the selection judging circuit 203 outputs '0' as the selection signal 210. When the added result 208 is smaller than the BASE+DM, the selection judging circuit 203 outputs '1' as the selection signal 210. In case that the DN 206 is a negative value, the selection judging circuit 203 judges whether the added result 208 is smaller than the BASE or not, and when the added result 208 is smaller than the BASE, the selection judging circuit 203 outputs '0' as the selection signal 210. When the added result 208 is not smaller than the BASE, the selection judging circuit 203 outputs '1' as the selection signal 210. After this, the multiplexer 204 outputs the outputted result 209 from the two input adder and subtracter 202 as the address after renewed DP' 211, when the selection signal 210 is '0'. And the multiplexer 204 outputs the outputted result 208 from the two input adder 201 as the address after renewed DP' 211 when the selection signal 210 is '1'.

As mentioned above, at the conventional address generating circuit, until the added result 208 at the two input adder 201 is decided, the two input adder and subtracter 202 and the selection judging circuit 203 do not start their valid operation. That is, the operation in the conventional address generating circuit is executed one by one. Therefore, there is a problem that the total delay time in this conventional address generating circuit becomes large. Actually, the total delay time becomes 'the delay time at the two input adder 201+the delay time at the two input adder and subtracter 202+the delay time at the multiplexer 204', or becomes 'the delay time at the two input adder 201+the delay time at the selection judging circuit 203+the delay time at the multiplexer 204'.

SUMMARY OF THE INVENTION

It is therefore an object of the present invention to provide an address generating circuit and a selection judging circuit used in this address generating circuit, in which address generation by a modulo addition is executed at high speed, by removing the one by one operation through eliminating the input/output dependency among operating sections.

According to a first aspect of the present invention, for achieving the object mentioned above, there is provided an address generating circuit, which generates an address for accessing cyclically to a memory area by a modulo addition. The address generating circuit provides a two input adder that adds an address and a renewing step, a three input adder and subtracter that adds the address and the renewing step, and adds the size of a modulo area (memory area accessed by modulo addressing) to an added result of the address and the renewing step, or subtracts the size of the modulo area from the added result of the address and the renewing step, a selection judging circuit that generates a selection signal for selecting one of outputs from the two input adder and the three input adder and subtracter, and a multiplexer that outputs an address after renewed as a circuit output by selecting one of the outputs from the two input adder and the three input adder and subtrater based on the selection signal from the selection judging circuit. And the two input adder, the three input adder and subtracter, and the selection judging circuit are worked in parallel and independently.

According to a second aspect of the present invention, there is provided an address generating circuit, which generates an address for accessing cyclically to a memory area by a modulo addition. In case that the address is 2N bits, a renewing step is N bits, and the size of a modulo area is N bits, the address generating circuit provides a two input adder that adds the address of 2N bits and the renewing step of N bits, and outputs its added result of 2N bits, a three input adder and subtracter that adds lower N bits of the address of 2N bits and the renewing step of N bits, and adds the size of the modulo area of N bits to an added result of the lower N bits of the address of 2N bits and the renewing step of N bits, or subtracts the size of the modulo area of N bits from the added result of the lower N bits of the address of 2N bits and the renewing step of N bits, and outputs an added result or an added and subtracted result of N bits, a concatenating means that concatenates upper N bits of the address of 2N bits to the output of N bits from the three input adder and subtracter from the side of the most significant bit of the three input adder and subtracter output, and outputs a concatenated result of 2N bits, a selection judging circuit that generates a selection signal for selecting one of outputs from the two input adder and the concatenating means based on the lower N bits of the address of 2N bits, the renewing step of N bits, and the size of the modulo area of N bits, and a multiplexer that outputs an address after renewed as a circuit output by selecting one of the output of 2N bits from the two input adder and the output of 2N bits from the concatenating means based on the selection signal from the selection judging circuit. And the two input adder, the three input adder and subtracter, and the selection judging circuit are worked in parallel and independently.

According to a third aspect of the present invention, in the first and second aspects, the selection judging circuit provides a mask circuit that detects the most significant bit from bits used actually for showing the size of the modulo area, and generates a mask by which upper bits than the detected most significant bit at the address are all cleared to zero, a NAND circuit that calculates an AND of a NOT of a sign bit of the renewing step, in which the most significant bits show the sign, and each bit showing the size of the modulo area, a three input adder and subtracter that adds the renewing step to an output from the mask circuit and subtracts a NAND circuit output from its added result, and an EXOR circuit that calculates an EXOR of the sign bit in the output from the three input adder and subtracter and the sign bit of the renewing step.

According to a fourth aspect of the present invention, in the third aspect, the size DM of the modulo area is shown as $2^{K-1} \leq DM < 2^K$ (K is an arbitrary integer), and lower K bits at the head address in the modulo area are all '0', and in the renewing step, the lower K bits show the number of renewing steps, and upper bits excluding the lower K bits show the sign of the renewing step. And the selection judging circuit generates the selection signal, by subtracting the size of the modulo area or '0' from the added result of the lower K bits of the address and the lower K bits of the renewing step at the three input adder and subtracter in the selection judging circuit, and by calculating the EXOR of a sign bit at a fixed position in the outputted result from the three input adder and subtracter and the sign bit of the renewing step at the EXOR circuit.

According to a fifth aspect of the present invention, there is provided a selection judging circuit, which judges whether an address after renewed, generated by adding a renewing step to an address before being renewed, for accessing cyclically to a modulo area, deviates from the modulo area or not. The selection judging circuit provides a mask circuit that detects the most significant bit from bits used actually for showing the size of the modulo area, and generates a mask by which upper bits than the detected most significant bit at the address before being renewed are all cleared to zero, a NAND circuit that calculates an AND of a NOT of a sign bit of the renewing step, in which the most significant bits show the sign, and each bit showing the size of the modulo area, a three input adder and subtracter that adds the renewing step to an output from the mask circuit and subtracts a NAND circuit output from its added result, and an EXOR circuit that calculates an EXOR of the sign bit in the output from the three input adder and subtracter and the sign bit of the renewing step.

According to a sixth aspect of the present invention, in the fifth aspect, the size DM of the modulo area is shown as $2^{K-1} \leq DM < 2^K$ (K is an arbitrary integer), and lower K bits at the head address in the modulo area are all '0', and in the renewing step, the lower K bits show the number of renewing steps, and upper bits excluding the lower K bits show the sign of the renewing step. And the selection judging circuit generates the selection signal, by subtracting the size of the modulo area or '0' from the added result of the lower K bits of the address and the lower K bits of the renewing step at the three input adder and subtracter in the selection judging circuit, and by calculating the EXOR of a sign bit at a fixed position in the outputted result from the three input adder and subtracter and the sign bit of the renewing step at the EXOR circuit.

BRIEF DESCRIPTION OF THE DRAWINGS

The objects and features of the present invention will become more apparent from the consideration of the following detailed description taken in conjunction with the accompanying drawings in which:

FIG. 5 is a diagram showing the difference between a three input adder and subtracter in the selection judging circuit at the present invention and a three input adder and subtracter in a selection judging circuit at the conventional technology;

FIG. 6 is a diagram showing the difference between the selection judging circuit at the present invention and the selection judging circuit at the conventional technology;

FIG. 7 is a diagram showing the difference of the addition and subtraction methods between the present invention and the conventional technology.

DESCRIPTION OF THE PREFERRED EMBODIMENTS

Figure 1:
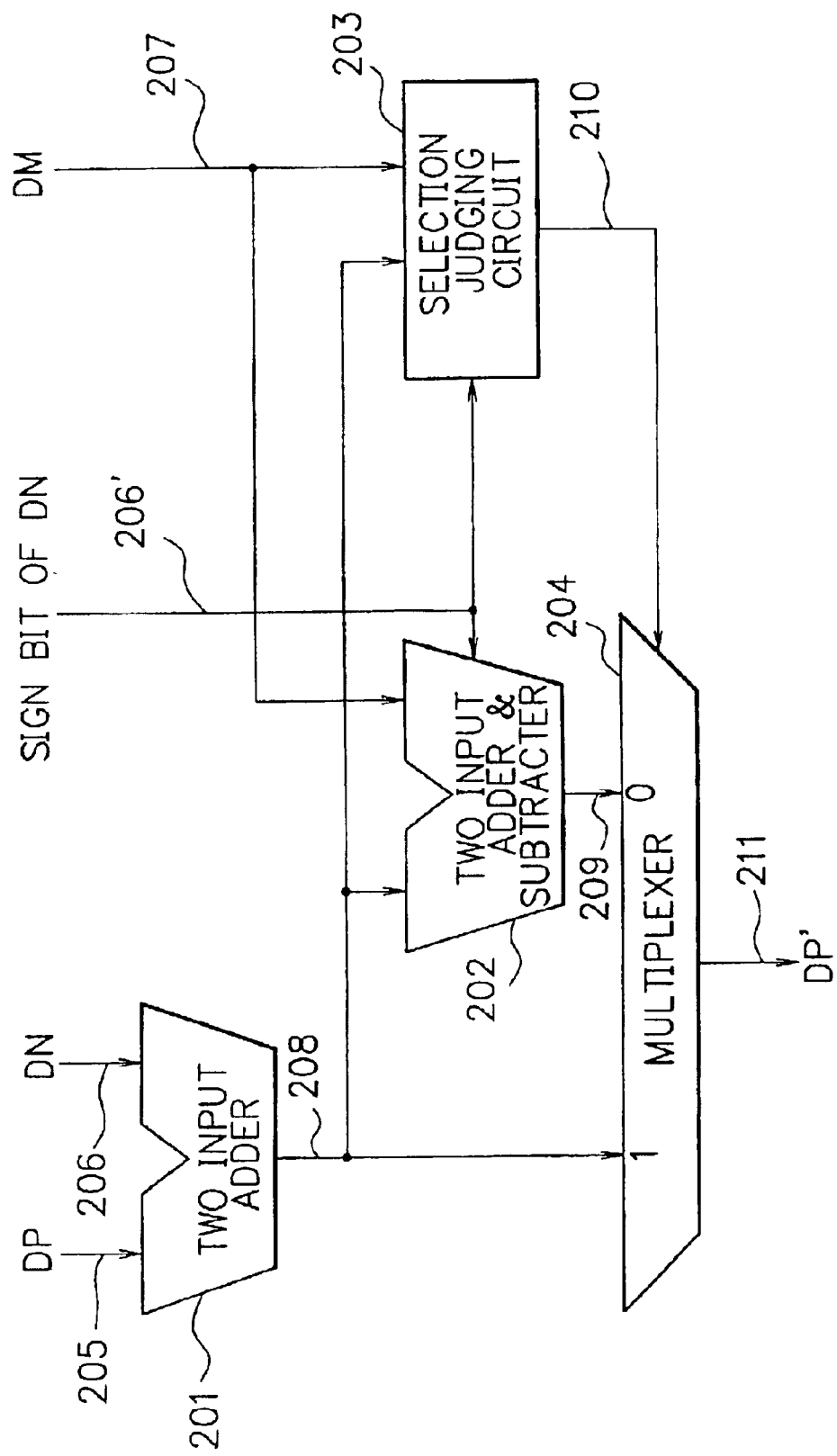
FIG. 1 is a block diagram showing a structure of a conventional address generating circuit.

Referring now to the drawings, embodiments of the present invention are explained in detail. In an address generating circuit at a first embodiment of the present invention, at a memory which is accessed by an address of 16 bits, the size DM of the modulo area of the 16 bits is shown as $2^{K-1} \leq DM < 2^K$, and lower K bits at the head address BASE in the modulo area are shown to be all '0'. In this, K is an integer being 15 or less. And also it is shown that an address generated by this address generating circuit of the present invention becomes an arbitrary integer from BASE to BASE+DM−1. Under these conditions mentioned above, at the address generating circuit of the present invention, an address DP' after renewed is generated by adding a renewing step DN of 16 bits to an address DP before being renewed. In this, when the DN is a negative value and the added result becomes smaller than the head address BASE, the DM is added to the added result. And when the DN is a positive value, and the added result becomes equal to or larger than the BASE+DM, the DM is subtracted from the added result. With this, the DP' after renewed is generated by correcting the added result through applying the method mentioned above. In this, (16−K) bits on the DN show the positive or negative sign of the DN.

Figure 2:
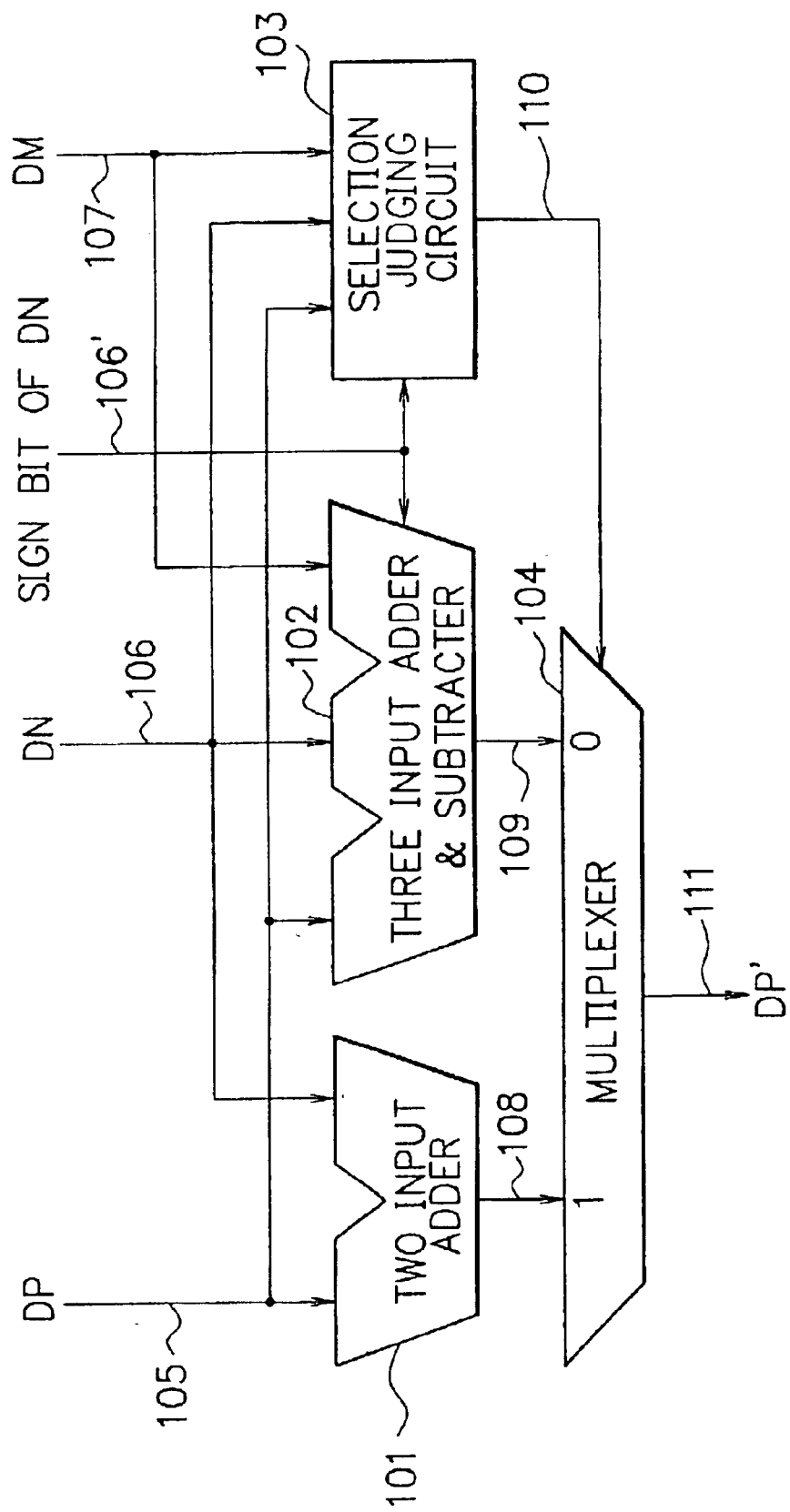
FIG. 2 is a block diagram showing a structure of a first embodiment of an address generating circuit of the present invention.

FIG. 2 is a block diagram showing a structure of the first embodiment of the address generating circuit of the present invention. As shown in FIG. 2, the first embodiment of the address generating circuit of the present invention provides a two input adder 101, a three input adder and subtracter 102, a selection judging circuit 103, and a multiplexer 104. The two input adder 101 adds a renewing step DN 106 to an address before being renewed DP 105. The three input adder and subtracter 102 adds the DN 106 to the DP 105, and further adds the size DM 107 of the modulo area to the added result of the DP 105 and the DN 106, or subtracts the DM 107 from the added result of the DP 105 and the DN 106.

The selection judging circuit 103 generates a selection signal 110 for selecting one of the outputted results 108 and 109 from the two input adder 101 and the three input adder and subtracter 102. The multiplexer 104 outputs an address DP' 111 after renewed as a circuit output by selecting one of the outputted results 108 and 109 based on the selection signal 110.

The DP 105 being the 16 bit address and the DN 106 being the 16 bit renewing step are inputted to the two input adder 101, and the two input adder 101 outputs the DP 105+DN 106 as a 16 bit added result 108 to the multiplexer 104.

The DP 105 being the 16 bit address, the DN 106 being the 16 bit renewing step, the sign bit 106' of the DN 106, and the DM 107 being 16 bits are inputted to the three input adder and subtracter 102. When the sign bit 106' of the DN 106 (=the most significant bit of the DN 106) is '0', the three input adder and subtracter 102 outputs DP+DN−DM as an added and subtracted result 109 being 16 bits to the multiplexer 104. And when the sign bit 106' of the DN 106 is '1', the three input adder and subtracter 102 outputs DP+DN+DM as the added result 109 being 16 bits to the multiplexer 104.

The DP 105 being the 16 bit address, the DN 106 being the 16 bit renewing step, the sign bit 106' of the DN 106, and the DM 107 being 16 bits are inputted to the selection judging circuit 103. In case that the sign bit 106' of the DN 106 is '0', if the added result of the lower K bits of the DP 105 and the lower K bits of the DN 106 is equal to or larger than the DM 107, the selection judging circuit 103 outputs '0' as the selection signal 110, if not, outputs '1'. In case that the sign bit 106' of the DN 106 is '1', if the added result of the lower K bits of the DP 105 and the lower K bits of the DN 106 is smaller than '0', the selection judging circuit 103 outputs '0' as the selection signal 110, if not, outputs '1'.

Figure 3:
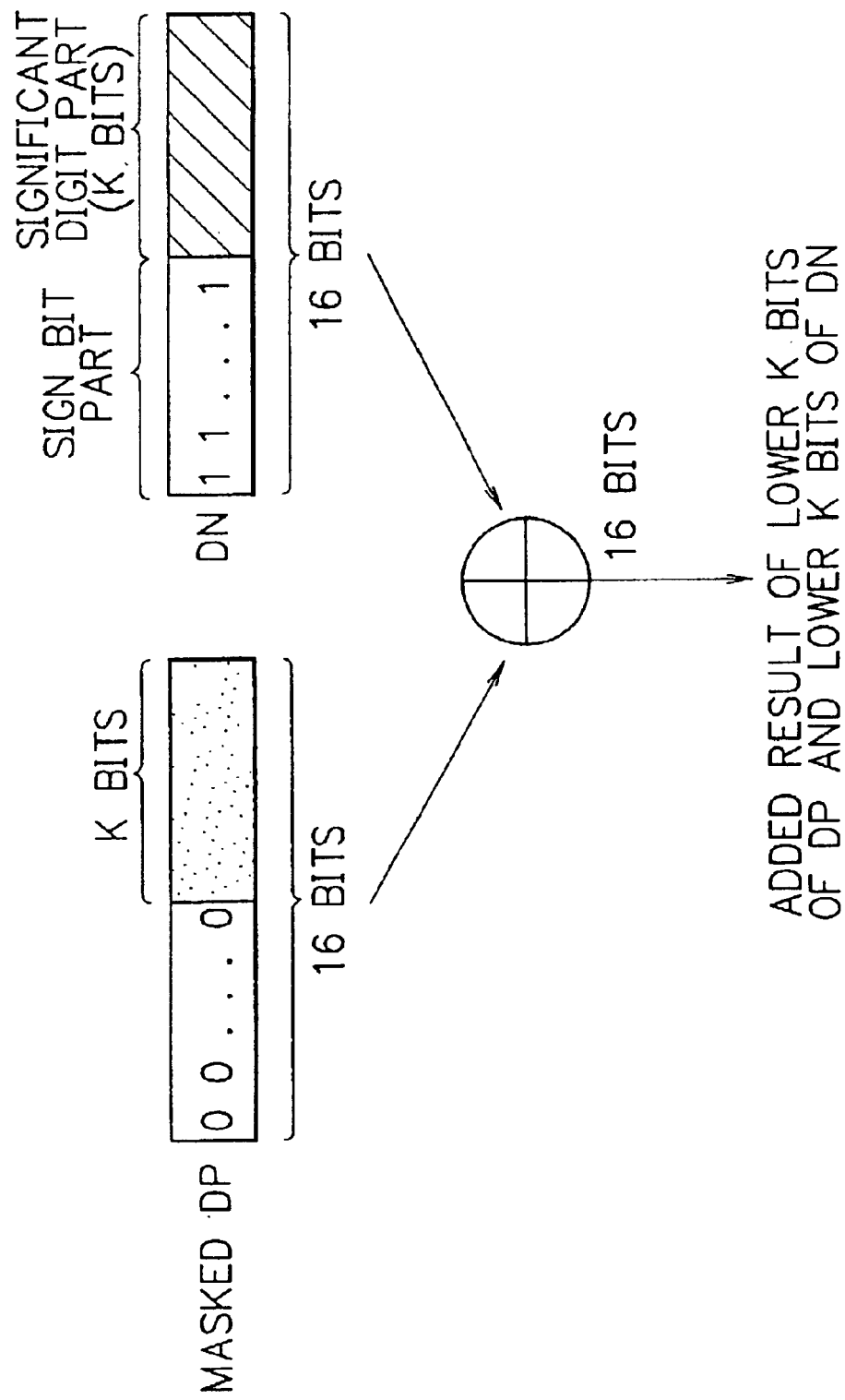
FIG. 3 is a diagram showing an addition of lower K bits of an address DP before being renewed and lower K bits of a renewing step DN at the first embodiment of the address generating circuit of the present invention.

FIG. 3 is a diagram showing the addition of the lower K bits of the DP 105 and the lower K bits of the DN 106 at the first embodiment of the address generating circuit of the present invention. As shown in FIG. 3, the addition of the lower K bits of the DP 105 and the lower K bits of the DN 106 is that the 16 bit value whose upper (16−K) bits of the DP 105 are cleared to zero and the 16 bit value of the DN 106 which is composed of a sign bit part being (16−K) bits and a significant digit part being K bits are added. In this, the comparison between, the lower K bits of the DP 105+the lower K bits of the DN 106 and the DM 107, is equivalent to the comparison between DP+DN and BASE+DM, because all of the lower K bits of the BASE are '0's. And also, the comparison between, the lower K bits of the DP+the lower K bits of the DN and '0', is equivalent to the comparison between DP+DN and BASE, because of the same reason mentioned above.

Figure 4:
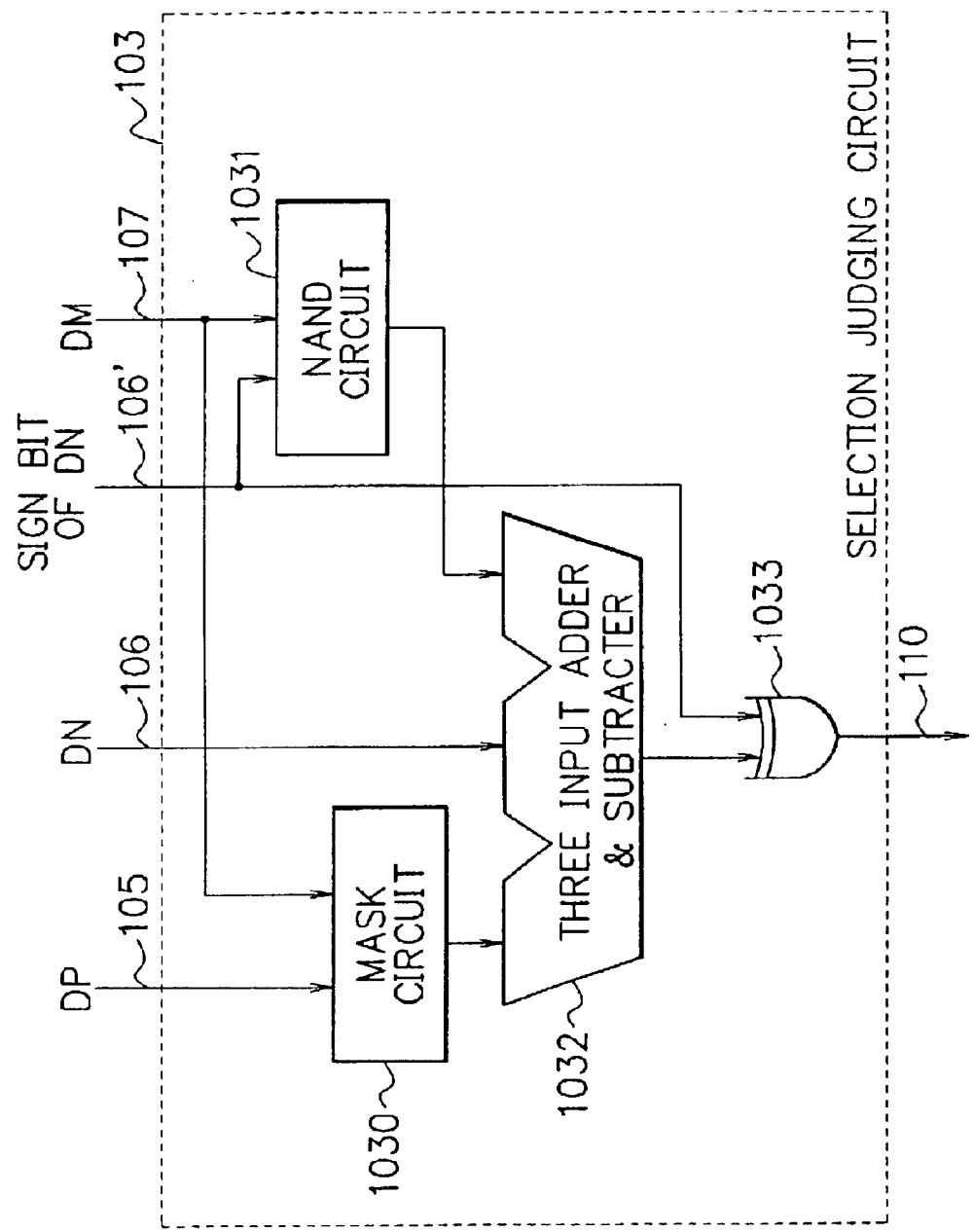
FIG. 4 is a block diagram showing a structure of a selection judging circuit shown in FIG. 2.

FIG. 4 is a block diagram showing a structure of the selection judging circuit 103 shown in FIG. 2. As shown in FIG. 4, the selection judging circuit 103 provides a mask circuit 1030, a NAND circuit 1031, a three input adder and subtracter 1032, and an EXOR gate 1033. The mask circuit 1030 extracts the lower K bits of the DP 105. The NAND circuit 1031 calculates an AND of a NOT of the sign bit 106' of the DN 106 and each bit in the DM 107. The three input adder and subtracter 1032 adds an outputted result from the mask circuit 1030 and the DN 106, and subtracts an outputted result from the NAND circuit 1031 from this added result. The EXOR gate 1033 calculates an EXOR of the sign bit at the added and subtracted result being 16 bits in length and is outputted from the three input adder and subtracter 1032 and the sign bit 106' of the DN 106.

The outputted result 108 being 16 bits in length and is outputted from the two input adder 101 and the outputted result 109 being 16 bits in length and is outputted from the three input adder and subtracter 102 are inputted to the multiplexer 104. The multiplexer 104, based on the inputted selection signal 110 from the selection judging circuit 103, outputs the outputted result 109 being 16 bits in length and is outputted from the three input adder and subtracter 102 as the circuit output DP' 111 being 16 bits when the selection signal 110 is '0'. And when the selection signal 110 is '1', the multiplexer 104 outputs the outputted result 108 being 16 bits in length and is outputted from the two input adder 101 as the circuit output DP' 111 being 16 bits.

In order to execute the addition and the subtraction at high speed, a carry-look-ahead adder is used as the two input adder 101, and as the three input adder and subtracter 102 and the three input adder and subtracter 1032, a carry-save adder and a carry-look-ahead adder at the final stage of their adder are used.

Next, referring to FIGS. 2 and 4, operation of the first embodiment of the address generating circuit of the present invention is explained in detail. In the first embodiment of the address generating circuit of the present invention, both addresses, in cases that the correction is needed and is not needed, are calculated speculatively, and one of the addresses is selected by judging whether the correction is needed or not, and the selected address is outputted as the circuit output.

First, the two input adder 101, the three input adder and subtracter 102, and the selection judging circuit 103 are worked in parallel and independently.

In order to calculate an address in case that correction is not needed, the two input adder 101 outputs an added result 108 by adding a DP 105 and a DN 106.

In order to calculate an address in case that correction is needed, the three input adder and subtracter 102 adds the DP 105 and the DN 106 and subtracts a DM 107 from the added result when the sign bit 106' of the DN 106 is '0'. When the sign bit 106' of the DN 106 is '1', the three input adder and subtracter 102 adds the DP 105, the DN 106, and the DM 107.

In the selection judging circuit 103, the mask circuit 1030 detects the most significant bit whose value is '1' in each bit in the DM 107. From the first bit to the (16−K)th bit counting from the first in the DM 107 are all '0' and the next bit of the (16−K)th bit is '1', therefore, the detected bit is positioned at the Kth bit counting from the last in the DM 107. The mask circuit 1030 forms a mask in which the Kth bit and bits being lower than the Kth bit are '1's and the other bits are '0's, based on this detected bit. The mask circuit 1030 extracts the lower K bits of the DP 105 by calculating an AND of each bit in the mask and each bit in the DP 105.

In parallel with the operation of the mask circuit 1030, the NAND circuit 1031 calculates an AND of a NOT of the sign bit 106' of the DN 106 and each bit in the DM 107. With this operation, when the sign bit 106' of the DN 106 is '0', the value 'DM' is generated, and when the sign bit 106' of the DN 106 is '1', the value '0' is generated.

After the outputs from the mask circuit 1030 and the NAND circuit 1031 are decided, the three input adder and subtracter 1032 adds the outputted result from the mask circuit 1030 and the DN 106, and subtracts the outputted result from the NAND circuit 1031 from this added result. With this operation, when the sign bit 106' of the DN 106 is '0', the subtraction, for judging whether the added result of the lower K bits of the DP 105 and the lower K bits of the DN 106 is equal to or larger than the DM 107, is executed. When the sign bit 106' of the DN 106 is '1', the subtraction, for judging whether the added result of the lower K bits of the DP 105 and the lower K bits of the DN 106 is smaller than '0', is executed.

In case that the sign bit 106' of the DN 106 is '0', when the sign bit (each of upper 16−K bits) of the added and subtracted result at the three input adder and subtracter 1032 is '0', it can be judged that the DP+DN deviates from the modulo area. And in case that the sign bit 106' of the DN 106 is '1', when the sign bit of the added and subtracted result at the three input adder and subtracter 1032 is '1', it can be judged that the DP+DN deviates from the modulo area. That is, when the sign bit 106' of the DN 106 is equal to the sign bit of the added and subtracted result at the three input adder and subtracter 1032, the DP+DN deviates from the modulo area. Therefore, the EXOR gate 1033 calculates an EXOR of the sign bit at the outputted result from the three input adder and subtracter 1032 and the sign bit 106' of the DN 106. With this operation, if the address after renewed DP' deviates from the modulo area, both of the sign bits become equal, and thus '0' is outputted as the selection signal 110. If not, '1' is outputted as the selection signal 110.

After the outputs from the two input adder 101, the three input adder and subtracter 102, and the selection judging circuit 103 are decided, the multiplexer 104 outputs the outputted result 109 from the three input adder and subtracter 102 as the circuit output DP' 111 when the selection signal 110 from the selection judging circuit 103 is '0'. And when the selection signal 110 is '1', the multiplexer 104 outputs the outputted result 108 from the two input adder 101 as the circuit output DP' 111.

As mentioned above, when the two input adder 101, the three input adder and subtracter 102, and the selection judging circuit 103 are made to work in parallel and independently, the selection judging circuit 103 becomes the critical path. Consequently, the total delay time at the first embodiment of the address generating circuit of the present invention becomes 'the delay time at the selection judging circuit 103+the delay time at the multiplexer 104'.

Next, referring to the drawings, the comparison of the delay time between the present invention and the conventional technology mentioned in the Japanese Patent Application Laid-Open No. HEI 7-168753 is studied.

The selection judging circuit 103 in the first embodiment of the address generating circuit of the present invention compares the added result of the lower K bits of the DP 105 and the DN 106 with the DM 107 or '0'. FIG. 5 is a diagram showing the difference between the three input adder and subtracter 1032 in the selection judging circuit 103 at the present invention and a three input adder and subtracter in the selection judging circuit 203 at the conventional technology. As shown in FIG. 5, the selection judgement can be executed by using the sign bit in the outputted result from the three input adder and subtracter in the selection judging circuit. That is, the selection judgement is executed by detecting that the (K+1)th bit from the last in the outputted result from the three input adder and subtracter is reversed by a carry.

In the present invention, the DN 106 is added to the DP 105 whose upper (16-K) bits are cleared to zero, therefore, the carry of the (K+1)th bit is reflected until the most significant bit. Consequently, even though the size DM ($2^{K-1} \leq DM < 2^K$) of the modulo area is changed, the selection judgement can be executed by this most significant bit.

In the conventional technology, when the added result of the DP+DN is compared with the BASE+DM or the BASE, as shown in FIG. 5, the selection judgement is executed by detecting that the (K+1)th bit from the last in the outputted result from the three input adder and subtracter is reversed by the carry. However, in the conventional technology, the carry of the (K+1)th bit is not reflected until the most significant bit, therefore, the (K+1)th bit at this arbitrary position must be detected. FIG. 6 is a diagram showing the difference between the selection judging circuit 103 in at the present invention and the selection judging circuit 203 in the conventional technology. As shown in FIG. 6, in the conventional technology, a multiplexer is needed to extract a bit at an arbitrary position in the selection judging circuit 203.

However in the present invention, since a bit at a fixed position is used, a multiplexer is not needed in the selection judging circuit 103. Consequently, in the conventional technology, the delay time at the multiplexer is added, compared with the present invention.

As shown in FIG. 6, the mask circuit 1030 is needed at the present invention, however in the conventional technology, a decoder circuit is needed to generate a position ((K+1)th position from the last) of a carry bit to be detected. The decoder circuit, as well as the mask circuit 1030, detects the most significant bit whose value is '1' in each bit in the DM 107. Therefore, in the present invention, the delay time at the mask circuit 1030 increases by at most one stage of the AND gate, compared with the conventional technology. As mentioned above, both of the conventional technology and the present invention have a factor that makes the delay time large, however, generally, the delay time at the multiplexer is larger than that at one stage of the AND gate. Therefore, the address generating circuit of the present invention has higher speed than that of the conventional technology.

The addition and subtraction at the three input adder and subtracter 1032 in the selection judging circuit 103 and at the three input adder and subtracter 102 in the address generating circuit at the present invention is executed at higher speed than that at the conventional technology in which the addition and subtraction of three data is executed in two steps in a divided manner. FIG. 7 is a diagram showing the difference of the addition and subtraction methods between the present invention and the conventional technology. As shown in FIG. 7, in the present invention, only one stage of a carry-save adder and one stage of a carry-look-ahead adder are needed in the three input adder and subtracter 1032. However, in the conventional technology, two stages of the carry-look-ahead adder are needed. Therefore, the addition and subtraction in the present invention can be executed at higher speed. In this, the operation at the carry-save adder is executed at higher speed than that at the carry-look-ahead adder.

As mentioned above, the delay time at the first embodiment of the address generating circuit of the present invention is smaller than that in the conventional technology. That is, the delay time in the first embodiment of the address generating circuit of the present invention is 'the delay time at the selection judging circuit 103+the delay time at the multiplexer 104'. And the delay time in the conventional technology is 'the delay time at the two input adder 201+the delay time at the two input adder and subtracter 202+the delay time at the multiplexer 204', or is 'the delay time at the two input adder 201+the delay time at the selection judging circuit 203+the delay time at the multiplexer 204'.

Next, correction examples of the added value of the DP 105 and DN 106 are explained in two cases that the DN 106 is a positive value and the DN 106 is a negative value. That is, calculation examples of the added value of the DP and the DN are explained.

First, the address generation example in the first embodiment of the address generating circuit of the present invention is explained, when the DN is a positive value and 'DP=0x012F, DN=0x0006, and DM=0x0010'. At this example, since the DM is 0x0010(=$2^4$), K=5, and the modulo area becomes from 0x0120 to 0x012F. And since the added value DP+DN is 0x0135, the added value deviates from the modulo area. At this time, the output (DP+DN) 108 from the two input adder 101 becomes 0x0135, and the output (DP+DN−DM) 109 from the three input adder and subtracter 102 becomes 0x0125. The output from the three input adder and subtracter 1032 in the selection judging circuit 103 becomes 0x000F (output from the mask circuit 1030)+0x0006(DN)−0x0010(DM)=0x0005. And the selection signal 110, which is the EXOR of the sign bit '0' of the output from the three input adder and subtracter 1032 and the sign bit 106' '0' of the DN 106 at the EXOR gate 1033, becomes '0'. Therefore, the outputted result 109 from the three input adder and subtracter 102 becomes the circuit output DP' 111 by selecting at the multiplexer 104.

Second, the address generation example in the first embodiment of the address generating circuit of the present invention is explained, when the DN is a negative value and 'DP=0x0123, DN=0xFFFA, and DM=0x0010'. At this example, as well as the example mentioned above, K=5, and the modulo area becomes from 0x0120 to 0x012F. And since the added value DP+DN is 0x011D, the added value deviates from the modulo area. At this time, the output (DP+DN) 108 from the two input adder 101 becomes 0x011D, and the output (DP+DN+DM) 109 from the three input adder and subtracter 102 becomes 0x012D. The output from the three input adder and subtracter 1032 in the selection judging circuit 103 becomes 0x0003(output from the mask circuit 1030)+0xFFFA(DN)−0x0000=0xFFFD. And the selection signal 110, which is the EXOR of the sign bit '1' of the output from the three input adder and subtracter 1032 and the sign bit 106' '1' of the DN 106 at the EXOR gate 1033, becomes '0'. Therefore, the outputted result 109 from the three input adder and subtracter 102 becomes the circuit output DP' 111 by selecting at the multiplexer 104.

Figure 8:
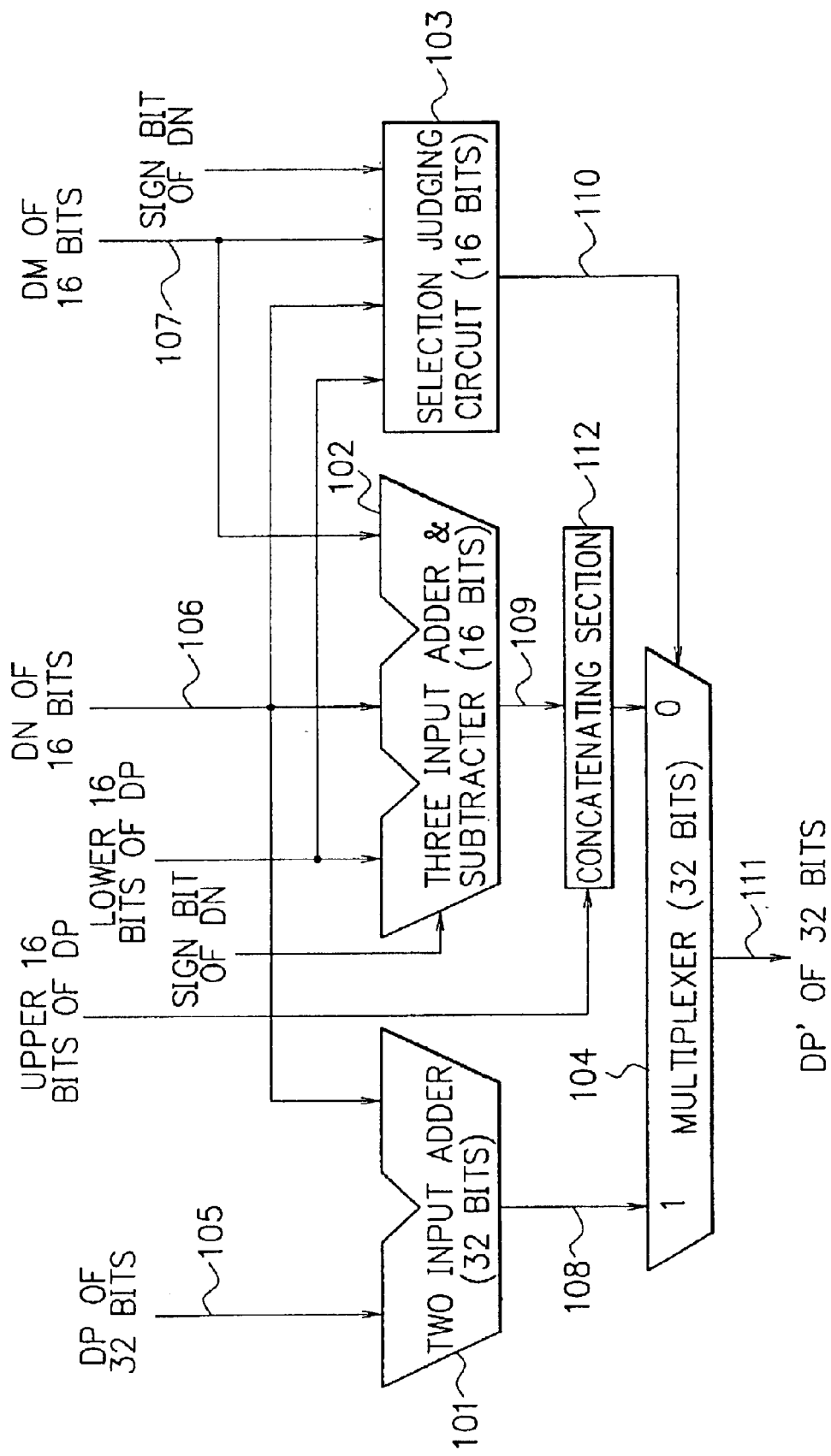
FIG. 8 is a block diagram showing a structure of a second embodiment of the address generating circuit of the present invention.

In the explanation of the first embodiment of the present invention, the case, in which the address DP 105, the renewing step DN 106, and the area size DM 107 are all composed of 16 bits, is explained. However, it is clear that the first embodiment of the address generating circuit of the present invention can be applied to other bit lengths. FIG. 8 is a block diagram showing a structure of a second embodiment of the address generating circuit of the present invention. Referring to FIG. 8, the second embodiment of the address generating circuit of the present invention is explained. In the second embodiment of the present invention, a case, in which the length of the address is 2N bits and the lengths of the renewing step and the area size are N bits respectively, such as the DP is 32 bits, the DN and the DM are 16 bits respectively, is explained. In FIG. 8, the data widths of the two input adder 101 and the multiplexer 104 are 32 bits respectively, and the lower 16 bits of the DP 105 are inputted to the three input adder and subtracter 102 and the selection judging circuit 103. And the upper 16 bits of the DP 105 and the outputted result 109 being the 16 bits from the three input adder and subtracter 102 are concatenated at a concatenating section 112. And this concatenated value being 32 bits is inputted to the multiplexer 104. The structure mentioned above is different from the first embodiment, and others are the same as in the first embodiment. The operation of the 32 bits is executed at the two input adder 101, while at the selection judging circuit 103, the operation of the 16 bits is executed. Consequently, the delay time at the selection judging circuit 103 is smaller than that at the two input adder 101. Therefore, the delay time at the second embodiment of the address generating circuit of the present invention becomes 'the delay time at the two input adder 101+the delay time at the multiplexer 104'.

As mentioned above, according to the present invention, the two input adder, the three input adder and subtracter, and the selection judging circuit are worked in parallel with one another. Because the one by one operation is eliminated, with this, the address generation by the modulo addition can be executed at high speed.

And the selection judging circuit adds a renewing step and an address whose upper bits excluding lower K bits are all cleared to zero, and compares this added result with the size of the modulo area or '0'. Therefore, when the selection judgement is executed by detecting that the (K+1)th bit from the last is reversed by a carry at the three input adder and subtracter in the selection judging circuit, the carry of the (K+1)th bit is reflected until the most significant bit. With this, even though the size of the modulo area is changed, the selection judgment can be executed by using the most significant bit. Consequently, at the present invention, the conventionally needed multiplexer in the selection judging circuit for extracting a bit at an arbitrary position is not needed, and the address generation can be executed at much higher speed.

And in case that the length of the address is larger than that of the renewing step and the area size, the delay time at the selection judging circuit becomes smaller than that at the two input adder. Therefore, in this case, the delay time becomes 'the delay time at the two input adder+the delay time at the multiplexer', and the address generation can be executed at much higher speed, compared with the conventional technology.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An address generating circuit, which generates an address for accessing cyclically to a memory area by a modulo addition, comprising:

in case that said address is 2N bits, a renewing step is N bits, and the size of a modulo area is N bits, a two input adder that adds said address of 2N bits and said renewing step of N bits, and outputs its added result of 2N bits;

a three input adder and subtracter that adds lower N bits of said address of 2N bits and said renewing step of N bits, and adds the size of said modulo area of N bits to an added result of said lower N bits of said address of 2N bits and said renewing step of N bits, or subtracts the size of said modulo area of N bits from said added result of said lower N bits of said address of 2N bits and said renewing step of N bits, and outputs an added result or an added and subtracted result of N bits;

a concatenating means that concatenates upper N bits of said address of 2N bits to said output of N bits from said three input adder and subtracter from the side of the most significant bit of said three input adder and subtracter output, and outputs a concatenated result of 2N bits;

a selection judging circuit that generates a selection signal for selecting one of outputs from said two input adder and said concatenating means based on said lower N bits of said address of 2N bits, said renewing step of N bits, and the size of said modulo area of N bits; and a multiplexer that outputs an address after renewed as a circuit output by selecting one of said output of 2N bits from said two input adder and said output of 2N bits from said concatenating means based on said selection signal from said selection judging circuit, wherein:

said two input adder, said three input adder and subtracter, and said selection judging circuit are worked in parallel and independently.

2. An address generating circuit in accordance with claim 1, wherein:

said selection judging circuit, comprising:

a mask circuit that detects the most significant bit from bits used for showing the size of said modulo area, and generates a mask where all bits having a higher significance than said detected most significant bit are all cleared to zero;

a NAND circuit that calculates an AND of a NOT of a sign bit of said renewing step, in which the most significant bits show said sign, and each bit showing the size of said modulo area;

a three input adder and subtracter that adds said renewing step to an output from said mask circuit and subtracts a NAND circuit output from its added result; and an eXOR circuit that calculates an eXOR of the sign bit in said output from said three input adder and subtracter and said sign bit of said renewing step.

3. An address generating circuit in accordance with claim 2, wherein:

the size DM of said modulo area is shown as $2^{K+1} \leq DM < 2^K$ (K is an arbitrary integer), and lower K bits at the head address in said modulo area are all '0', and in said renewing step, said lower K bits show the number of renewing steps, and upper bits excluding said lower K bits show the sign of said renewing step, wherein:

said selection judging circuit generates said selection signal, by subtracting the size of said modulo area or '0' from said added result of said lower K bits of said address and said lower K bits of said renewing step at said three input adder and subtracter in said selection judging circuit, and by calculating said eXOR of a sign bit at a fixed position in the outputted result from said three input adder and subtracter and said sign bit of said renewing step at said eXOR circuit.

4. An address generating circuit, which generates an address for accessing cyclically to a memory area by a modulo addition, comprising:

a two input adder that adds an address and a renewing step;

a three input adder and subtracter that adds said address and said renewing step, and adds the size of a modulo area (memory area accessed by modulo addressing) to an added result of said address and said renewing step, or subtracts the size of said modulo area from said added result of said address and said renewing step;

a selection judging circuit that generates a selection signal for selecting one of outputs from said two input adder and said three input adder and subtracter having a three input carry save adder and a two input carry look-ahead adder; and a multiplexer that outputs an address after renewed as a circuit output by selecting one of said outputs from said two input adder and said three input adder and subtracter based on said selection signal from said selection judging circuit, wherein:

said two input adder, said three input adder and subtracter, and said selection judging circuit are worked in parallel and independently, wherein said selection judging circuit, comprising:

a mask circuit that detects the most significant bit from bits used for showing the size of said modulo area, and generates a mask where all bits having a higher significance than said detected most significant bit are all cleared to zero;

a NAND circuit that calculates an AND of a NOT of a sign bit of said renewing step, in which the most significant bits show said sign, and each bit showing the size of said modulo area;

a three input adder and subtracter that adds said renewing step to an output from said mask circuit and subtracts a NAND circuit output from its added result; and an eXOR circuit that calculates an eXOR of the sign bit in said output from said three input adder and subtracter and said sign bit of said renewing step.

5. An address generating circuit in accordance with claim 4, wherein:

the size DM of said modulo area is shown as $2^{K+1} \leq DM < 2^K$ (K is an arbitrary integer), and lower K bits at the head address in said modulo area are all '0', and in said renewing step, said lower K bits show the number of renewing steps, and upper bits excluding said lower K bits show the sign of said renewing step, wherein:

said selection judging circuit generates said selection signal, by subtracting the size of said modulo area or '0' from said added result of said lower K bits of said address and said lower K bits of said renewing step at said three input adder and subtracter in said selection judging circuit, and by calculating said eXOR of a sign bit at a fixed position in the outputted result from said three input adder and subtracter and said sign bit of said renewing step at said eXOR circuit.

6. A selection judging circuit, which judges whether an address after renewed, generated by adding a renewing step to an address before being renewed, for accessing cyclically to a modulo area, deviates from said modulo area or not, comprising:

a mask circuit that detects the most significant bit from bits used actually for showing the size of said modulo area, and generates a mask by which upper bits than said detected most significant bit at said address before being renewed are all cleared to zero;

a NAND circuit that calculates an AND of a NOT of a sign bit of said renewing step, in which the most significant bits show said sign, and each bit showing the size of said modulo area;

a three input adder and subtracter that adds said renewing step to an output from said mask circuit and subtracts a NAND circuit output from its added result; and an eXOR circuit that calculates an eXOR of the sign bit in said output from said three input adder and subtracter and said sign bit of said renewing step.

7. A selection judging circuit in accordance with claim 6, wherein:

the size DM of said modulo area is shown as $2^{K+1} \leq DM < 2^K$ (K is an arbitrary integer), and lower K bits at the head address in said modulo area are all '0', and in said renewing step, said lower K bits show the number of renewing steps, and upper bits excluding said lower K bits show the sign of said renewing step, wherein:

said selection judging circuit generates said selection signal, by subtracting the size of said modulo area or '0' from said added result of said lower K bits of said address and said lower K bits of said renewing step at said three input adder and subtracter in said selection judging circuit, and by calculating said eXOR of a sign bit at a fixed position in the outputted result from said three input adder and subtracter and said sign bit of said renewing step at said eXOR circuit.

* * * * *